United States Patent [19]
Atkinson

[11] 4,172,444
[45] Oct. 30, 1979

[54] SOLAR PANEL

[76] Inventor: John W. Atkinson, 420 Hutchinson St., Vista, Calif. 92083

[21] Appl. No.: 916,563

[22] Filed: Jun. 19, 1978

[51] Int. Cl.$^2$ .................................................. F24J 3/02
[52] U.S. Cl. ...................................... 126/466; 165/168
[58] Field of Search ............... 126/270, 271; 237/1 A; 165/168, 179, 180, 181; 138/107; 52/489, 762; 428/518, 315, 321; 260/859 PV

[56] References Cited

U.S. PATENT DOCUMENTS

| | | | |
|---|---|---|---|
| 2,823,016 | 2/1958 | Greer, Jr. .................. | 29/157.3 C X |
| 3,670,056 | 6/1972 | Heiberger et al. ............ | 260/859 PV |
| 3,832,820 | 9/1974 | Eggert ......................... | 52/762 |
| 4,011,856 | 3/1977 | Gallagher ..................... | 126/271 |
| 4,024,853 | 5/1977 | Gordon ........................ | 126/271 |
| 4,055,162 | 10/1977 | Gonzalez ..................... | 165/169 X |
| 4,079,781 | 3/1978 | Wesseltoft .................. | 165/171 X |
| 4,080,703 | 3/1978 | Beck, Jr. .................... | 29/157.3 C |
| 4,086,913 | 5/1978 | Gavin ......................... | 126/271 |
| 4,114,597 | 9/1978 | Erb ........................... | 126/271 |
| 4,120,287 | 10/1978 | Marles et al. ............... | 126/271 |

FOREIGN PATENT DOCUMENTS 2522154 11/1976 Fed. Rep. of Germany ........... 126/271

*Primary Examiner*—Samuel Scott
*Assistant Examiner*—Larry Jones
*Attorney, Agent, or Firm*—Warren F. B. Linsley

[57] ABSTRACT

An extruded solar collector formed of inexpensive material which may be used individually or readily assembled in groups in a series or parallel arrangement to form a panel by unskilled personnel with simple tools to provide an effective solar ray converter.

3 Claims, 6 Drawing Figures

SOLAR PANEL

BACKGROUND OF THE INVENTION

This invention relates to solar panels that receive and absorb radiant heat from the sun and convey this heat energy to a useful purpose with a minimum amount of investment.

1. Field of the Invention

This invention is particularly directed to a simple and inexpensive solar collector that can be quickly and easily assembled into a solar panel attached to a frame that can be secured on a roof, wall or other surface for supplemental heating of domestic water needs.

2. Description of the Prior Art

Heat exchangers or solar energy concentrators, particularly of the type adapted to collect cold or heat, have been constructed either with a series of tubes embedded in a flat black metallic surface or have comprised a curved or semi-cylindrical or parabolic reflector with a blackened tube mounted at approximately its focal point with U.S. Pat. No. 1,946,184 and U.S. Pat. No. 4,000,734 being representative thereof. Relative to this latter form of the prior art, fins or vanes have been mounted about the tube in an effort to obtain more efficiency from the unit. The back side of the tube is generally insulated to reduce energy losses.

At best, the prior art solar concentrating collectors have needed an elaborate system of gears and racks or other means to shift or otherwise change the positions of the exchange or collector unit used so that its relative position to the sun will remain constant.

While such prior art inventions do suggest a workable approach for tracking the sun, the particular implementations described in these patents have in general fallen short of what is required in a low cost and practical system.

In order to obviate the disadvantages of the prior art, a new and improved solar panel is provided which is comparatively inexpensive to manufacture and assemble and made from materials that cost a fraction of the cost of materials heretofore used. The disclosed solar panel may be assembled by the user or other unskilled persons with simple tools and materials.

SUMMARY OF THE INVENTION

In accordance with the invention claimed, an improved solar energy collecting and converting panel is provided which is compact and inexpensive to manufacture by virtue of the materials from which it is made and has good weather resistant properties and significantly improves the efficiency of both conventional flat plate and concentrating collectors.

It is, therefore, one object of this invention to provide an improved solar panel that may be used individually or in groups to form panels of any size to supplement the heating needs of a home, business or factory complex.

Another object of this invention is to provide a simple extruded scale free solar panel which obtains a high degree of efficiency relative to its monitary investment in the conversion of solar energy to useable heat.

A further object of this invention is to provide a new and improved compact, low profile inexpensive solar energy collecting system formed from prefabricated extruded plastic modules that are formed into a water-tight panel by joining together the modules with simple pipe fittings cemented thereto.

A still further object of this invention is to provide a new and improved solar collector module which may be snapped onto a frame with other like modules to form a roof mountable solar collector panel.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
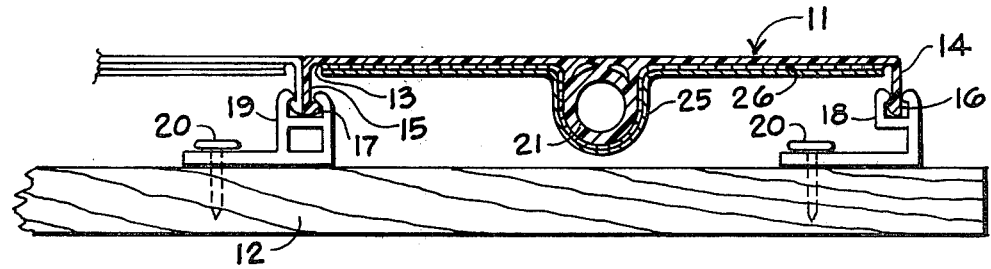
FIG. 1 is a cross-sectional view of one of the collectors shown in FIG. 2 taken along the line 1—1.
Figure 2:
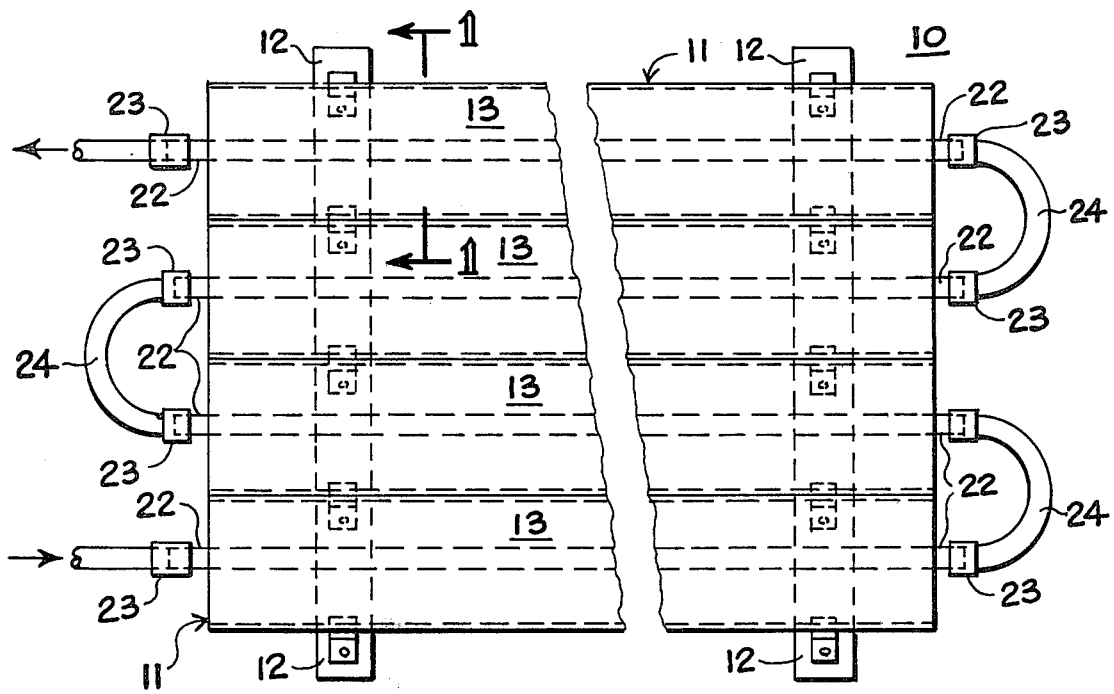
FIG. 2 is a plan view of an assembled solar panel formed from a plurality of modules snapped onto a supporting frame and showing the joining of the extruded modules by preformed pipe connectors and illustrating the path of fluid flow therethrough.
Figure 3:
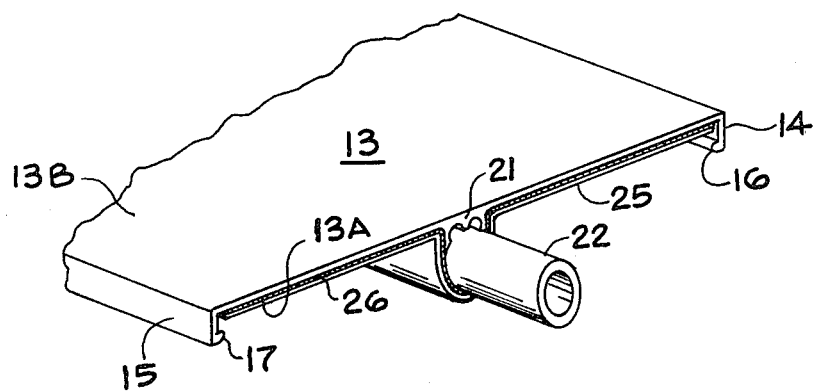
FIG. 3 is an isometric end view of part of the extruded module shown in FIG. 1 in which the fin portion and associated foil have been removed from around a part of the pipe portion of the extrusion.

Referring more particularly to the drawing by characters of references, FIG. 2 discloses a solar energy collection panel 10 formed by suitably fastening one or more panel modules 11, as shown in FIGS. 1-3, to a frame formed by a pair of frame members 12. The panel module comprises an extruded flat member 13 having a pair of legs 14 and 15 formed integral therewith extending laterally of the flat member 13 in the same direction. The ends of the legs may be provided with suitable feet or distortions 16 and 17, respectively, each snap fitting and engaging with a pair of spacedly mounted clamps 18 and 19 which are selectively mounted by suitable fastening means 20 on frame members 12.

As shown in FIG. 2, a pair of spacedly arranged frame members 12 and their associated clamps 18 and 19 when clamped to the extruded member forming the flat member 13 and its legs 14 and 15 form a rigid panel configuration.

The panel module 11, as shown in FIGS. 1-3, further comprises an extruded pipe portion 21 extending longitudinally of the flat member 13 and legs 14 and 15. This pipe portion may be provided with one or more openings 22 extending longitudinally of the flat member 13 of panel module 11 and providing a cylindrical pipe configuration at the ends of each panel module so that suitable pipe fitting can be applied thereto in the manner shown in FIG. 2.

It should be noted that when the panel module 11 is extruded, it comprises an elongated member comprising flat member 13, its integral legs 14, 15 and their feet 16, 17, together with the pipe portion 21 all of the same length.

At this stage in the manufacture of the solar energy collection panel 10, the ends of the utilized panel modules are trimmed to remove a portion of the flat member 13 and its associated legs 14, 15 and feet 16, 17 exposing and retaining the cylindrical configuration 22 of the pipe portion 20 in the manner shown in FIG. 3.

The exposed pipe configuration 22 is provided to accept suitable pipe fittings or couplings 23 and 24 to connect in the series arrangement shown in FIG. 2 the pipe portions 21 of a plurality of panel modules 11 to provide a solar energy collection panel 10.

FIGS. 1 and 3 illustrate that an aluminum or copper foil 25 may be bonded by suitable glue or cement 26 to the underside or bottom surface 13A of the extrusion comprising the bottom surface of the flat member 13 and the pipe configuration 22 of pipe portion 21 of panel module 11. This aluminum or copper foil or paint 25 provides a low resistance path for the heat of the absorbed solar rays by the top surface 13B of the flat member 13 in its travel from the point of receipt any place on the top surface 13B to pipe portion 21 and more particularly to the fluid such as water flowing therethrough.

If the extruded portion of the panel module 11 is formed of a polyvinyl chloride (PVC) or more particularly a chlorinated polyvinyl chloride (CPVC) the solar rays absorbed by this material at any point along its surface will be conducted to the aluminum or copper foil and then flow through the low resistance path offered by the foil to the fluid flowing through the pipe configuration 22 rather than directly through the high resistance path of the PVC or CPVC material to the fluid in the pipe configuration.

It should be noted that any suitable material may be used for the extruded parts of the panel module 11 however PVC and CPVC plastic material is particularly suitable since both materials are durable and tough and will not deteriorate when exposed to sunlight. CPVC material is more resistant to high temperature than PVC material and retains its strength and withstands maximum water system pressures in the pipe configuration even at a temperatures approaching the boiling point of water.

These materials are easily assembled with known glues and cements and are light in weight and avoid the problems encountered with metal pipes and fittings, namely corrosion and tuberculation. This plastic material will not rust or corrode, is chemically inert and resist the build up of mineral deposits.

Since at the present time the CPVC plastic material is more expensive than PVC material, it may be desirable to use it to merely form the pipe configuration 22.

Figure 4:
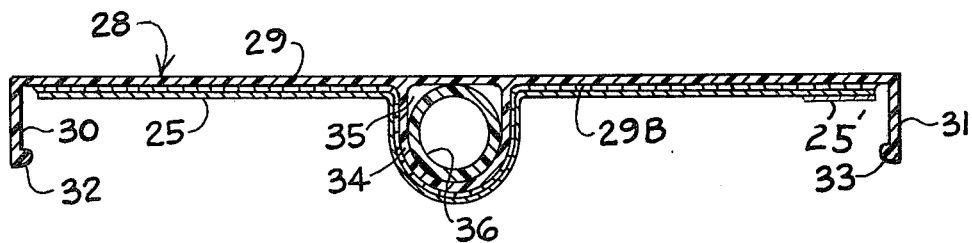
FIG. 4 illustrates a modification of the collector shown in FIG. 1 wherein a separate pipe of like or different material is inserted into an extruded panel segment.
Figure 5:
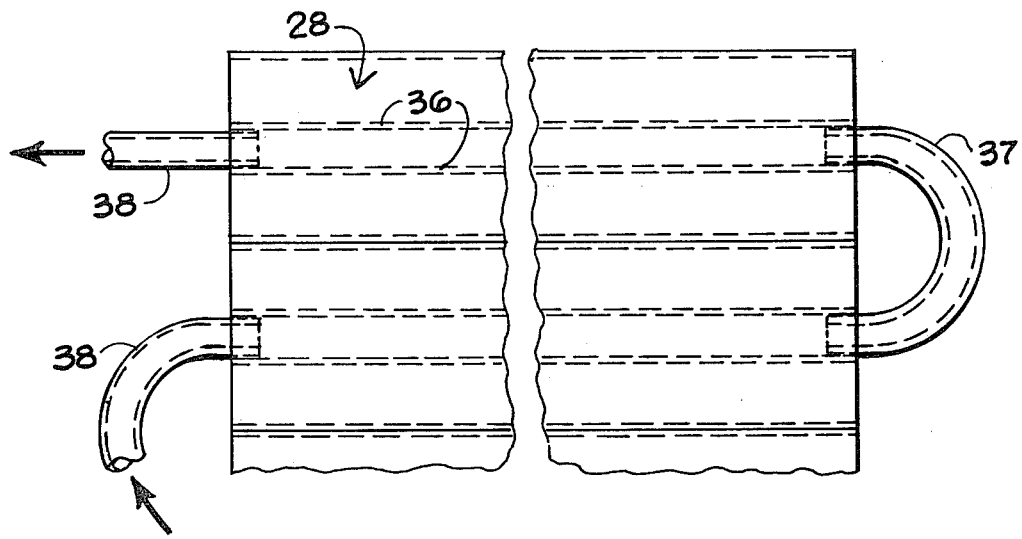
FIG. 5 is a plan view of a part of a panel embodying the collector shown in FIG. 4 and illustrating that the pipe couplings connecting the end of adjacent collectors are inserted into and sealed in the ends of the collector pipes.

FIGS. 4 and 5 disclose such a configuration wherein FIG. 4 illustrates that the panel module 28 comprises an extruded flat member 29 having laterally extending legs 30 and 31 extending in a common direction in the same manner as the legs of panel module 11 of FIGS. 1-3 and containing feet 32 and 33. In addition, this panel module is provided with a channel portion 34 extruded to extend in the same direction as legs 30 and 31 from the flat member 29, the hollow interior 35 of which forms a passageway for a separately extruded pipe 36. This pipe when slipped into the hollow interior 35 of the channel portion 34 of panel module 28 forms a friction tight fit therewith so as to provide a good heat conductive path between the walls of the channel portion 34 and pipe 35.

FIG. 4 further illustrates that the panel module shown contains an aluminum or copper foil or paint 25 suitably secured to the bottom surface 29B of the flat member 29 of the panel module 28 and its channel portion 34 in the same manner as described above for panel module 11 of FIGS. 1-3. The foil or paint 25 may be covered with an insulating coating 25', partially shown for conserving heat in the foil and preventing its dissipation to the atmosphere.

FIG. 5 illustrates that if the hollow interior of pipe 36 of panel module 28 is slightly larger in size than the outside diameter of the pipe fitting 37 and the incoming and outgoing pipe lines 38, that these pipe fittings and pipe lines may be inserted into pipe 36 and suitably cemented thereto to form a convenient and satisfactory fit.

Figure 6:
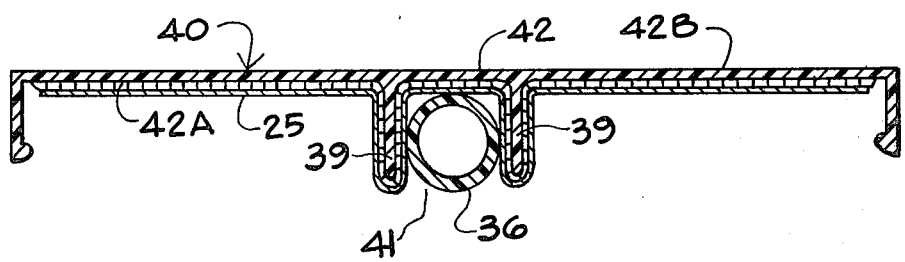
FIG. 6 is a further modification of the panel modules shown in FIGS. 1-5.

FIG. 6 illustrates a further modification of the panel module configuration shown in FIGS. 1-5 wherein the pipe portion 39 of panel module 40 varies particularly from the channel portion 34 of FIG. 4 by being open at 41 to receive along the length of the channel portion 39, pipe 36 in a siding frictional fit. Foil 25 may be suitably fastened to the bottom surface 42A of the flat member 42 of the panel module and in and around the inner surface of channel 39 in the same manner and for the same reasons as described above for FIGS. 1-5.

Although but a few embodiments of the invention have been illustrated and described, it will be apparent to those skilled in the art that various changes and modifications may be made therein without departing from the spirit of the invention or from the scope of the appended claims.

What is claimed is:

1. An elongated extruded solar panel comprising:
    a relatively flat member of heat absorbing opaque thermoplastic material having a surface for exposure to solar rays,
    a monolithic passage formed on the undersurface of said flat member along the length thereof, and said passage receiving a pipe means therein
    a thin metallic conductive member cemented to said undersurface for conducting heat absorbed by said surface and transmitted through said material by conduction to said conductive member,
    each of said members being provided with a pair of legs extending laterally from its underside, one along each of its longitudinal edges,
    fastening means formed at the free end of each of said legs engaging support and fastening means
    the heat absorbed by said material being transmitted by conduction through said pipe means to fluid flowing therethrough.

2. The elongated extruded solar panel set forth in claim 1 wherein:
    said conductive member comprises an aluminum foil cemented to and at least partially encompassing said pipe means for conducting the heat of the solar rays absorbed by said surface to said pipe means and minimizing heat lost by refraction of the solar panel to atmosphere.

3. A solar panel for absorbing solar energy comprising:
    a plurality of elongated extruded heat absorbing opaque thermoplastic members each having a flat top defining an upper surface arranged in a planar arrangement with upper surfaces of the other members, a monolithic passage formed on the underside of the top of each member, said passage receiving a pipe means therein, each of said members being provided with a pair of legs extending laterally from its underside one along each of its longitudinal edges, fastening means formed at the free end of each of said legs for engaging support and fastening members, a thin smooth metal conductive member cemented to the underside of each of said surfaces and covering the exposed surface of said pipe means, and U-shaped pipes for connecting juxtapositioned adjacent ends of said pipe means into a series fluid conducting arrangement, whereby the heat from solar rays received and absorbed by the upper surfaces of said members is conducted therethrough and absorbed by said conductive member on the underside of said flat upper surfaces and conducted to the cooler surface of said pipe means.

* * * * *